US006802402B2

United States Patent
Bausch et al.

(10) Patent No.: US 6,802,402 B2
(45) Date of Patent: Oct. 12, 2004

(54) BRAKING DEVICE THAT CAN BE RELEASED ELECTROMAGNETICALLY

(75) Inventors: Edmund Bausch, VS-Obereschach (DE); Joachim Hubrich, Donaueschingen (DE)

(73) Assignee: Kendrion Binder Magnete GmbH, Villingen-Schwenningen (DE)

( * ) Notice: Subject to any disclaimer, the term of this patent is extended or adjusted under 35 U.S.C. 154(b) by 0 days.

(21) Appl. No.: 10/160,276

(22) Filed: Jun. 4, 2002

(65) Prior Publication Data
US 2002/0185342 A1 Dec. 12, 2002

(30) Foreign Application Priority Data
Jun. 7, 2001 (DE) ......................................... 101 27 664

(51) Int. Cl.[7] ........................ B60T 13/04; F16D 55/08
(52) U.S. Cl. ........................ 188/171; 188/72.7; 188/161
(58) Field of Search ........................ 188/72.7, 161, 188/166, 158, 159, 160, 162, 163, 164, 165, 171

(56) References Cited

U.S. PATENT DOCUMENTS

| 4,030,579 | A | * | 6/1977 | Sell ............................ 188/171 |
| 5,096,020 | A | * | 3/1992 | Korhonen .................... 187/376 |
| 5,186,286 | A | * | 2/1993 | Lindberg ..................... 188/171 |
| 5,231,887 | A | * | 8/1993 | Arvidsson et al. ............. 74/88 |
| 5,267,479 | A | * | 12/1993 | Arvidsson .................... 74/126 |
| 5,366,044 | A | * | 11/1994 | Jamieson et al. ........... 187/359 |
| 6,158,822 | A | * | 12/2000 | Shirai et al. .................... 303/3 |
| 6,311,808 | B1 | * | 11/2001 | Halasy-Wimmer et al. ...... 188/72.6 |

FOREIGN PATENT DOCUMENTS

| DE | 617 195 | 8/1935 |
| DE | 699 779 | 12/1940 |
| DE | 1 854 646 | 7/1962 |
| DE | 28 54 452 | 6/1980 |
| DE | 39 31 014 | 3/1991 |
| EP | 0 465 831 | 1/1992 |
| GB | 1 440 334 | 6/1976 |
| GB | 2 360 335 | 9/2001 |
| WO | WO 97/29292 | * 8/1997 |

* cited by examiner

Primary Examiner—Robert A. Siconolfi
(74) Attorney, Agent, or Firm—Nath & Associates PLLC; Gary M. Nath; Marvin C. Berkowitz

(57) ABSTRACT

A braking device that can be released electromagnetically exhibits at least one brake shoe (20), which is pressed against a braking area by the force of a brake spring (14) in order to brake a linear or rotary motion. A magnet system exhibits a coil (1) and an armature (4), while current fed to the coil (1) causes the armature (4) to move against the force exerted by the brake spring (14), with the result that the brake shoes (10) is able to rise from the braking area (13) and thus release the brake. To achieve a high braking force with a magnet system of small structural dimensions the brake force of the brake spring (14) is transmitted from the armature (4) to the brake shoes (10) by at least one pressure element (5) with diagonal wedge areas (7, 8).

14 Claims, 5 Drawing Sheets

BRAKING DEVICE THAT CAN BE RELEASED ELECTROMAGNETICALLY

Figure 1:
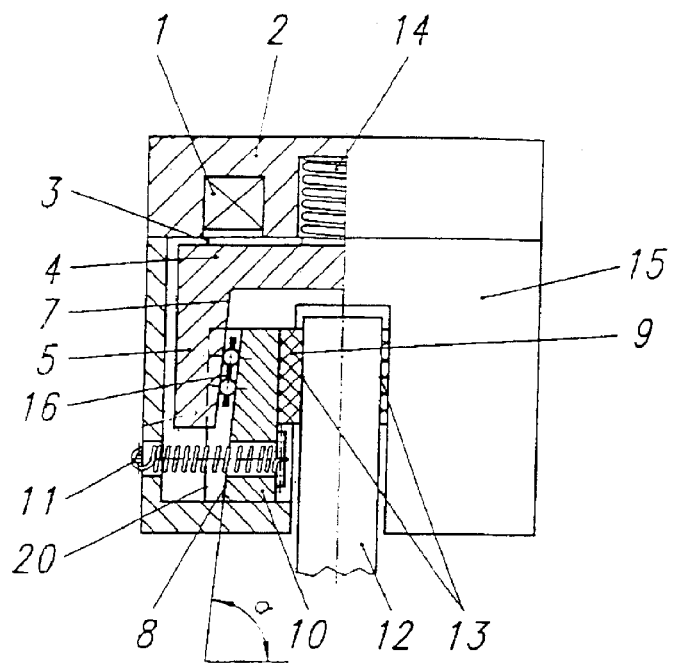

The invention relates to a braking device that can be released electromagnetically, in accordance with the preamble to claim 1.

Braking devices that can be released electromagnetically, particularly spring-loaded brakes, serve to brake static and dynamic loads and to hold them in place. In the case of braking devices intended to brake rotational movement, the spring-loaded brake is usually installed directly on the drive motor. Spring-loaded brakes of this kind are used, e.g., in drive technology to rapidly brake electromotors powering loads or flywheel masses when the current is cut off. In the case of braking devices that can be released electromagnetically, a magnet system is used to release the spring-loaded brake, which [in German] is also called "airing" the brake. By allowing current to run to the coil of the magnet system an armature is electromagnetically moved against to the force of the brake spring, in order to thereby release the drive for subsequent motion. When current to the coil is cut off, the armature no longer works against the force of the brake spring due to the absence of magnetic force, with the result that the brake spring presses a brake shoe against a braking surface, e.g., a brake disk or rail, thus producing the braking moment needed to stop the drive and lock it.

The size of this kind of electromagnetically released braking device is basically determined by the magnitude of the braking moment or force that is required, since the magnet system of the braking device must be able to overcome the force of the brake spring exerted during the release process, i.e., when the brake shoe is lifted from the braking surface.

The invention is based on the problem of creating an braking device released electromagnetically that can produce a large braking force or braking moment in a device of limited size.

The invention solves this problem with a braking device that exhibits the features of claim 1.

Advantageous embodiments of the invention are indicated in the secondary claims.

In accordance with the invention the braking force produced by the one or more brake springs is diverted by at least one pressure element to diagonal wedge areas and is transmitted in reinforced form to at least one brake shoe. The armature of the magnet system basically acts on the pressure element in the direction of the brake spring. The effect is that the braking force or braking moment is greater than the spring force of the brake spring, while the magnet system for releasing the brake must overcome only the slighter spring force of the brake spring. Thus a weaker magnet system, with its correspondingly smaller size, can be used even when the braking force is greater.

With the selection of the angle of the diagonal wedge area, which determines the deflection or enhancement of force, it is possible to optimally utilize the maximum possible spring energy of the brake springs and to accommodate the structural specifications of the braking device.

Ideally the magnet system will be overexcited at the beginning of the release process, while the armature is in motion; after the armature reaches its terminal position operation is switched to nominal excitation. The result is that the brake is very quickly released and can be kept in released state with reduced power.

In the following the invention will be described in greater detail on the basis of the depicted exemplary embodiments. Shown in the drawing are:

FIG. 1
An initial exemplary embodiment of the braking device in semi-section

Figure 2:
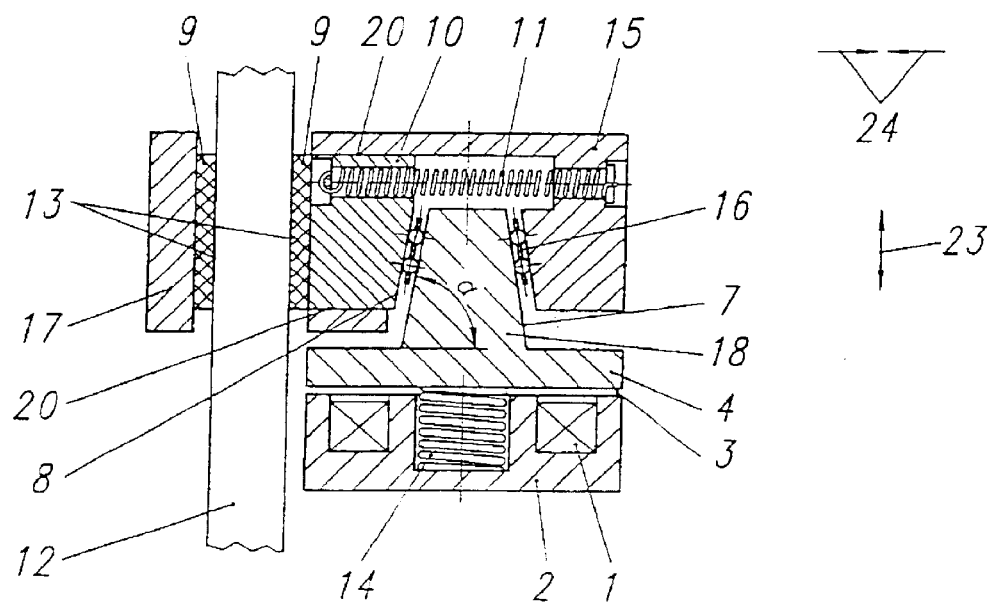

FIG. 2
An second exemplary embodiment of the braking device in section

Figure 3:
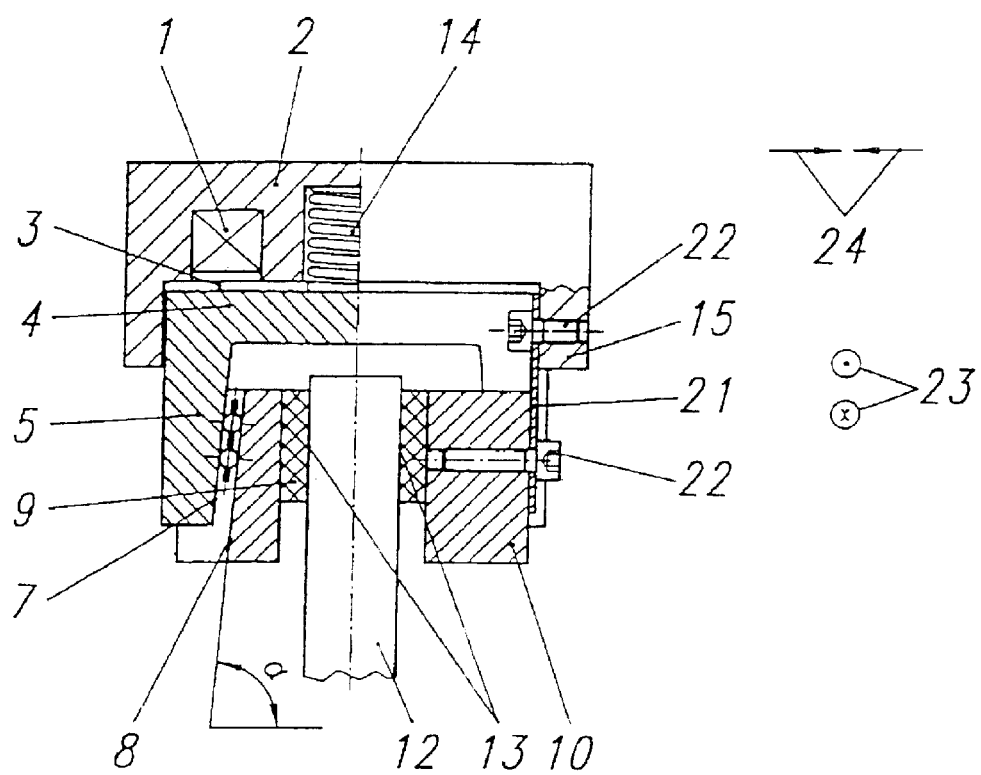

FIG. 3
A third exemplary embodiment of the braking device in section

Figure 4:
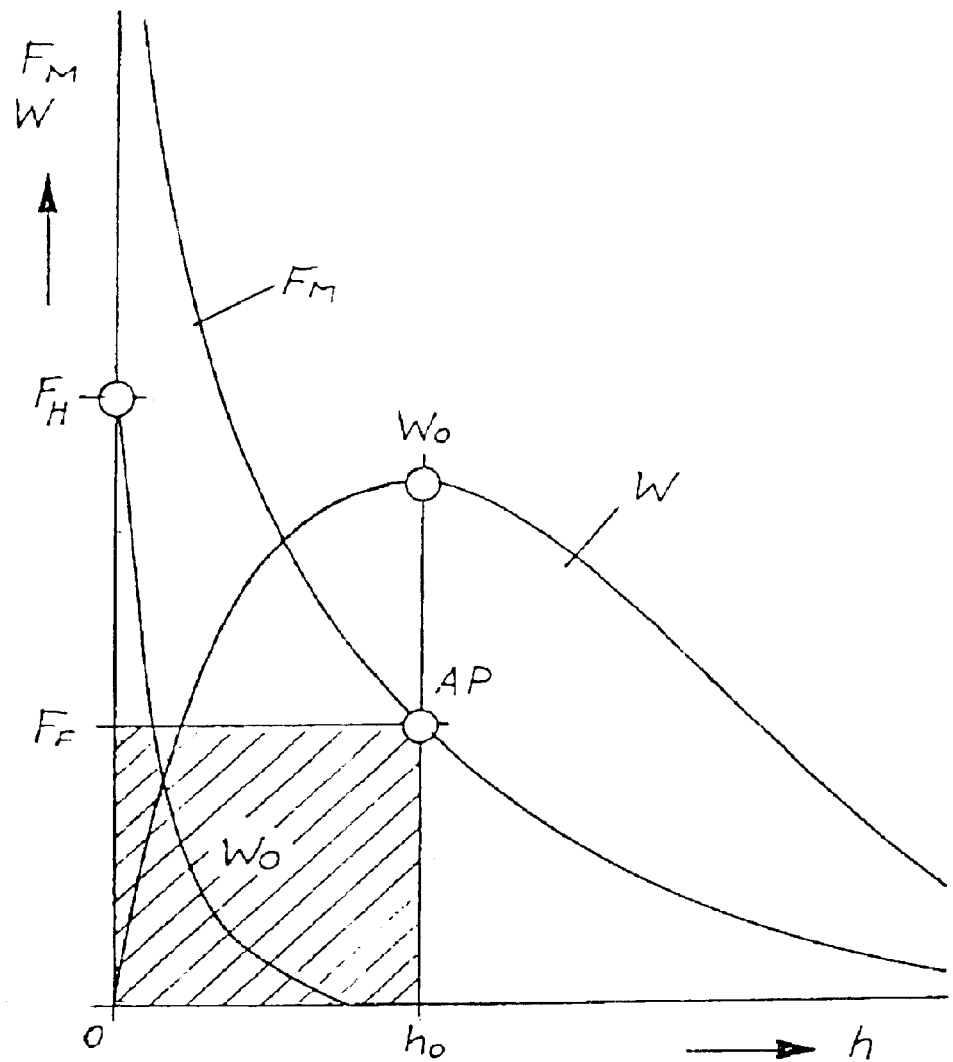

FIG. 4
A diagram to elucidate the optimal design of the braking device in the embodiments shown in FIGS. 1 to 3

Figure 5:
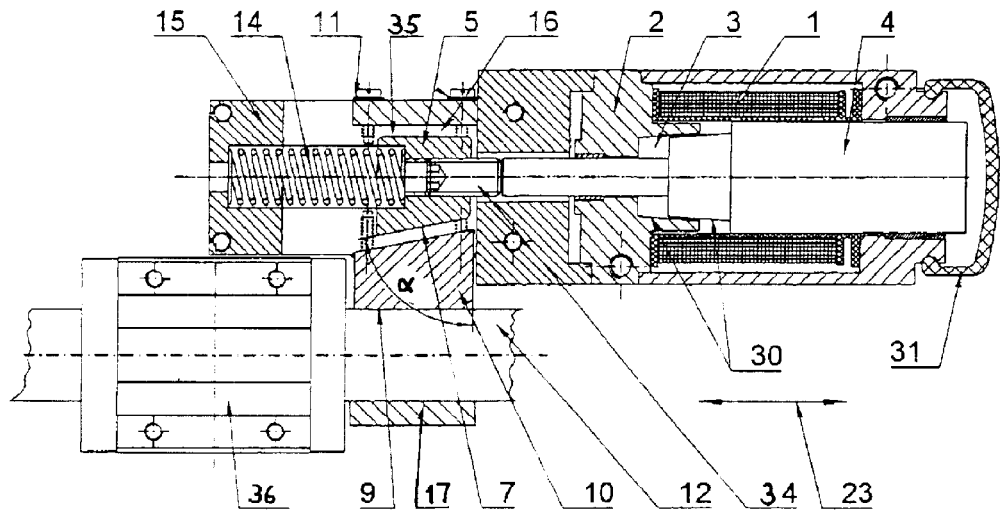

FIG. 5
A fourth exemplary embodiment of the braking device in section

Figure 6:
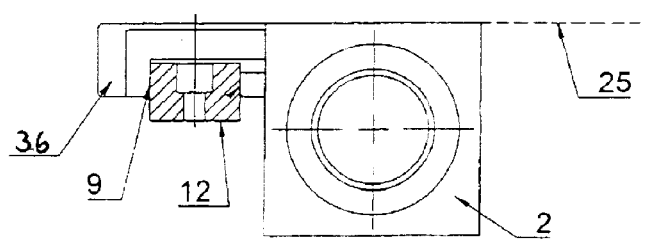

FIG. 6
A front view of FIG. 5 in an initial form

Figure 7:
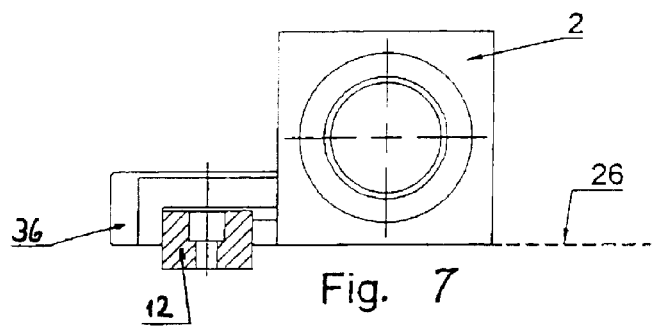

FIG. 7
A front view of FIG. 5 in a second form

Figure 8:
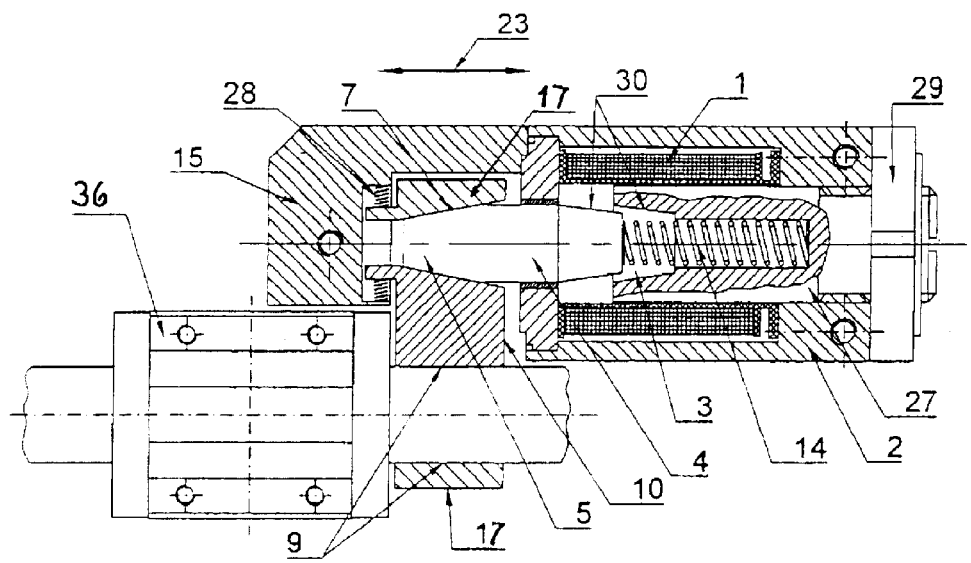

FIG. 8
A fifth exemplary embodiment in section

Figure 9:
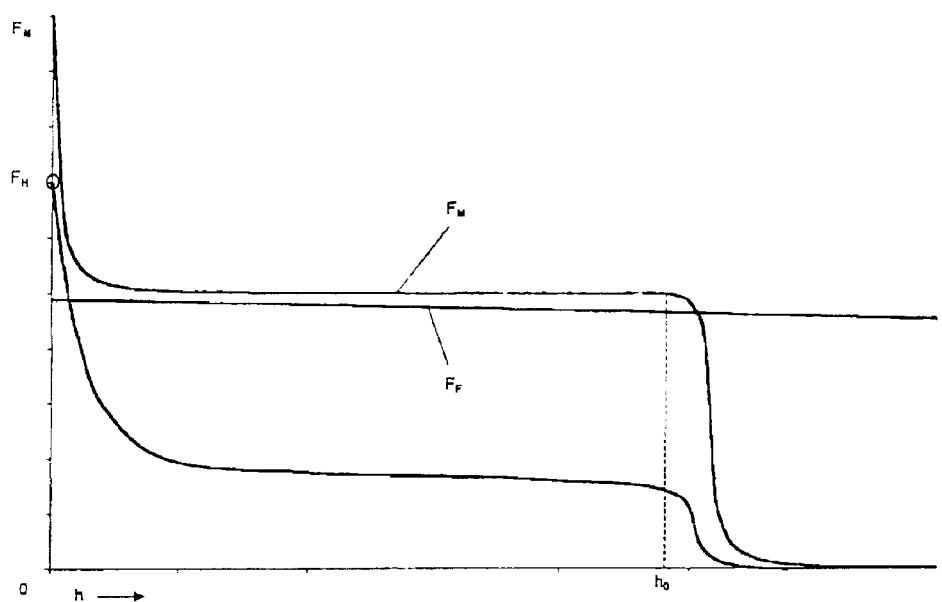

FIG. 9
A diagram showing the optimal design of the braking device in the fourth and fifth embodiments.

In the exemplary embodiments described below identical parts are indicated with identical reference numerals; the parts are described only once.

In the first exemplary embodiment of FIG. 1 an electromagnetically released braking device is shown, whose magnet system is a pot-type magnet system and consists of a coil 1 and a magnet body 2. Positioned in front of the face of the coil 1 and of the magnet body 2 is an armature 4, which can move axially around the armature path 3. Formed as a single piece with the armature 4 are two pressure elements 5, which are positioned in symmetric fashion relative to the central axis and which face away from the magnet system. The pressure elements 5 clasp a brake rail or brake disk 12 in claw-like fashion. A brake shoe 10 is positioned between the pressure elements 4 and the brake rail 12. The brake shoes have brake linings 9, with which they engage with braking areas 13 belonging to the brake rail 12. On their inside the pressure elements 5 each exhibit a diagonal wedge area 7, while the outside of the brake shoes 10 exhibit a corresponding diagonal wedge area 8. The wedge areas 7 and 8 exhibit the same angle cc relative to the perpendicular of the braking area 13. Positioned between the wedge areas 7 and 8 in each case is a flat-cage rolling bearing 16. The brake shoes 10 are mounted and guided in a housing 15 that is permanently joined to the magnet body 2, in such a way that the brake shoes 10 in the drawing plane of FIG. 1 can be moved freely perpendicular to the brake rail 12 and perpendicular to the direction of motion of the armature 4. In the direction of motion of the brake rail 12 running perpendicular to the drawing plane of FIG. 1 the brake shoes 10 are supported in form-fitting fashion within the housing. The guidance and support of the brake shoes 10 can be realized, e.g., with recesses 20 in the housing 15. Positioned in the magnet body 2 is a brake spring 15, which takes the form of a pressure spring that works axially. The brake spring 14 is supported on one side by the magnet body 2 and on the other side by the armature 4. Also provided are reset springs 11, which are designed as tension springs and are positioned both on the brake shoes 10 and on the housing 15, so that they lift the brake shoes 10 from the brake rail 12.

If the coil 1 is not fed with current, the brake spring 14 presses the armature 4 downwards with the pressure elements 5, as shown in FIG. 1. With the wedge areas 7 and 8 the pressure elements 5 press the brake shoes 10 against the brake rail 12, so that the latter is arrested. This condition is shown in FIG. 1. To release the braking device the coil 1 is fed with current. As a result, the armature 4 is drawn around the armature path 3 against the force of the brake spring 14, and the pressure elements 5 move upward, along with their wedge areas 7, with the result that the brake shoes 10 and their brake linings 9 are released from the brake areas 13 of the brake rail 12. In the process, the reset springs 11 assure that the brake linings 9 are reliably lifted from the brake areas 13. An air gap S arises here between the brake linings 9 and the brake areas 13.

It is evident that the brake areas 13 can be positioned both on a brake rail 12 that moves in linear fashion perpendicular to the drawing plane of figure, and on a rotating brake disk. It is also evident that the braking device can be positioned in stationary fashion, while the brake rail or brake disk 12 is allowed to move. As an alternative, the brake rail 12 can be stationary and the braking device positioned at the load being braked, which moves in linear fashion on the brake rail 12.

FIG. 2 shows a second exemplary embodiment of the braking device. While in the first embodiment the braking device clasps the brake rail 12 on its longitudinal rim, in the second exemplary embodiment the braking device is positioned laterally on the brake or brake disk 12. Here again the device is depicted in braked condition.

In the second exemplary embodiment a pressure element 18 is combined with the armature 4 to form a single piece and is designed as a double wedge with two diagonal wedge areas 7. The wedge area 7 turned away from the brake rail 12 interacts with a diagonal wedge area belonging to the housing 15, while the wedge area 7 facing the brake rail 12 works together with a diagonal wedge area 8 belonging to the brake shoe 10. The brake shoe 10 is mounted perpendicular to the brake rail 12 in the housing 15 and moves freely. In the direction of motion of the brake rail 12, which extends in the direction of arrow 23, i.e., vertically on the plane of the drawing, the brake shoe 10 is supported in form-fitting fashion inside the recess 20 of the housing 15, so as to absorb the braking forces. The reaction forces of the brake shoe 10 are absorbed by a brake shoe 17 permanently molded to the housing 15. The entire braking device is rigid in the braking direction (arrow 23), but perpendicular thereto it is mounted in floating fashion. If the coil 1 is not fed with current, the brake spring 14 presses the armature 4 upward in the drawing plane, with the result that the pressure element 18 shaped as a double wedge is pressed, along with its wedge areas 7, between the wedge areas of the housing 15 and the brake shoe 10. The brake shoe 10 is pressed against the brake rail 12, so that the latter is braked between the brake shoes 10 and 17 by the brake linings 9. To release the brake the coil 1 is fed with current, so that the coil 1 draws the armature 4 against the force of the brake spring 14, and the pressure element 18 is retracted smoothly on the flat-cage rolling bearings. The reset spring 11 is now able to lift the brake shoe 10 from the brake area 13, with the result that the brake 12 becomes free. Since the pressure element 18 is designed as a double wedge, twice the braking force is provided in this second embodiment as is in the initial embodiment shown in FIG. 1.

FIG. 3 shows a third exemplary embodiment whose basic design corresponds to the embodiment of FIG. 1.

In contrast to the first exemplary embodiment, the brake shoes 10, which are guided within recesses 20 in the housing 15, are braced by means of reset springs 21, which take the form of leaf springs. The reset springs 21 are secured with screws 33 to the housing 15 on one side and to the brake shoe 10 on the other. The leaf springs 21 are elastic in the direction of motion 24 of the brake shoes 10, but are rigid in the direction of motion 23 of the brake rail 12.

The manner of operation and the advantages of the braking device according to the invention in the embodiments shown in FIGS. 1 to 3 are explained below on the basis of the diagram in FIG. 4.

Conventional single-disk brakes have a short armature path h and thus a high magnetic force $F_M$. Since with these brakes the magnetic force of the armature is directed in the same direction as the motion of the brake shoe the following equation applies for the armature path h and the air gap s of the brake $$h=2s.$$

If such conventional brakes are operated at over-excitation of the magnet system, the magnetic force, and thus the brake force also, can be increased about twofold. A further increase is not useful since given a higher spring force in the brake spring the magnetic force, at normal excitation of the magnet system, i.e., at the nominal power of the coil, is no longer able to hold the armature against the large force of the brake spring in the released final position. Thus an over-excitation of more than three-fold the nominal power is no longer advantageous. The brake force $F_B$ thus equals $$F_B=2 \cdot F_F \cdot \mu=2 \cdot W \cdot \mu/S_{max}$$

Here $F_F$ is the spring force of the brake spring, $\mu$ is the frictional coefficient, W the spring energy, and $S_{max}$ the predetermined maximum permissible air gap between the friction linings and the brake rail. The spring energy of the brake spring that can be utilized in these conventional brakes is calculated as $$W=s \cdot F_F=h \cdot F_F$$

This usable spring energy is consequently low due to the short armature path h. The spring energy of the brake spring, therefore, is not optimally utilized.

In contrast to these conventional braking devices, the invention optimally utilizes the maximum possible spring energy, with $$W_o=h_o \cdot F_F$$

This is due to the adjustment made by the deflection and reinforcement of force achieved by the angle α of the diagonal wedge areas 7 and 8, as can be seen from the diagram of FIG. 4. FIG. 4 depicts both the magnetic force $F_M$ and the spring energy W as a function of the armature path h.

The optimally used spring energy $W_o$ and thus the maximum braking force is given for an operating point AP and an armature path $h_o$. The maximum permissible air gap $s_{max}$ is adjusted by the angle α of the diagonal wedge areas 7 and 8 according to the equation $$tg\ \alpha=2h_o/s_{max}$$

Due to the larger armature path $h=tg\ \alpha \cdot s/2$ the magnetic force $F_M$ and thus also the force of the brake spring 14 is smaller than with conventional brakes. As a result, the force of the brake spring in the terminal armature position can be securely maintained at nominal power, even with a tenfold over-excitation. Due to the reinforcement of force the brake according to the invention can achieve a braking force roughly ten times that of a conventional brake, given the same structural volume and the same air gap s, in accordance with the equation $$F_B = F_F \cdot \mu t g \; \alpha = 2W_o \cdot h \; \mu/S_{max}$$

assuming the initial force of the brake spring $F_F$ and thus the armature path $h_o$ correspond to the operational point AP for the spring energy $W_o$, as is shown in FIG. 4.

In the diagram shown in FIG. 4 the operational point AP is indicated for the maximum spring energy $W_o$, which is given by the function $$W = F_M \cdot h$$

The armature path $h_o$ can be read from the diagram, and given the maximum air gap $s_{max}$—which is determined by the design and contains the new air gap and the attrition reserve—the brake force reinforcement or angle $h_o \; \alpha$ of the diagonal wedge areas 7 and 8 can be calculated according to $$tg \; \alpha = 2 \cdot h_o/s_{max}$$

After the terminal position of the armature 4 is reached at h=0 due to over-excitation according to the curve $F_M$ in FIG. 4, the system converts to excitation at nominal current, and the holding force $F_H$ of the magnetic force is established. In the example of FIG. 4 this holding force $F_H$ is about twice as large as the spring force $F_F$ of the brake spring 14, so that the armature 4, and thus the brake in the released position, can be reliably maintained until the coil 1 is no longer provided with current.

Thus at the operational point AP, given a predetermined maximum air gap $s_{max}$, the largest possible spring energy of the brake spring 14 is converted into braking force.

FIG. 5 shows a fourth exemplary embodiment of the braking device, also in braked condition.

While in the exemplary embodiments shown in FIGS. 1 to 3 the magnet system is designed as a pot-type magnet system, in which the armature 4 is positioned in front of the axial front side of the coil 1 and the magnet body 2, the magnet system in the exemplary embodiment shown in FIG. 5 takes the form of a lifting magnet system. In this lifting magnet system the armature 4 moves coaxially in the coil 1, while the design of the pole 30 of the armature 4 and the magnet body 2 determine in a known manner the characteristic curve of the magnetic force $F_H$, as a function of the armature path 3. The conical design of the pole 30 shown in FIG. 5 leads to, e.g., the characteristic curve shown in FIG. 9, in which the magnetic force $F_M$ is constant over a large portion of the armature path h. The pressure element 5 is secured to a rod that extends the armature 4 axially and that runs through the housing 15. The pressure element 5 is attached to the rod of the armature 4 by means of an adjusting screw 34, so that the axial position of the armature 4 can be optimally adjusted to the given mounting conditions, for example, to compensate manufacturing tolerances and wear. On the side of the pressure element 5 turned away from the magnet system the brake spring 14 is supported in the housing 15. If the coil 1 is not fed with current, the brake spring 14 presses the pressure element 5 to the right in the depiction given in FIG. 5, so that the pressure element 5 acts on the brake shoe 10 by means of its diagonal area 7, pressing the brake shoe 10 against the brake rail 12. The reactive force of the brake shoe 10 is absorbed by a brake shoe 17. If the coil 1 is fed with current, the armature 4 is pulled to the left and presses the pressure element 5 against the force of the brake spring 14 with the armature rod, so that the wedge area 7 of the pressure element 5 releases the brake shoe 10 and the brake is released. Provided as a reset spring 11 is a leaf spring that takes effect between the housing 15 and the brake shoe 17 and that holds the brake shoes 10 and 17 in released condition. Flat-cage rolling bearings 16 facilitate the rolling motion of the diagonal wedge areas 7 of the pressure element 5 on the corresponding diagonal wedge areas 8 of the brake shoe 10, or on a glide plane 35 that runs parallel to the direction of the motion, so that the brake shoe 10 is moved at a right angle to the motion of the armature 4 and the pressure element 5.

In the exemplary embodiment of FIG. 5 the braking device is permanently mounted on a carriage 36, which is conducted in linear fashion along the brake rail 12. By activating the braking device the carriage 36 is braked on the brake rail 12 and is held in place.

FIG. 6 shows a version of the braking device according to the fourth embodiment shown in FIG. 5, in which the braking device and its upper rim 25 do not reach beyond the upper rim of the carriage 36.

FIG. 7 shows a modified version of the braking device depicted in FIG. 5, in which the braking device is positioned on the carriage 36 in such a way that its lower edge 26 does not reach beyond the lower edge of the carriage 36.

From FIGS. 6 and 7 it can be seen that the braking device in this embodiment is particularly well-suited geometrically for linear drive systems.

FIG. 8 shows a fifth exemplary embodiment of the braking device, in which, similar to the embodiment shown in FIG. 5, the magnet system is designed as a lifting magnet system.

In contrast to the exemplary embodiment shown in FIG. 5 the armature 4 is designed as a pressure element 5 on its end projecting from the coil 1; this pressure element 5 has the shape of a double wedge and is formed on both its sides with diagonal wedge areas 7. The diagonal wedge areas 7 of the pressure element 5 slide on corresponding diagonal wedge areas belonging to the brake shoes 10 and 17. When the brake is released the brake shoes 10 and 17 are lifted from the brake rail 12 by reset springs 28 that in this embodiment are designed as pressure springs supported on one side by the housing 15 and on the other side by the brake shoes 10 and 17. In this embodiment the flat-cage rolling bearings are replaced by a coating that is applied to the diagonal wedge areas 7 and 8 and that permits sliding.

The screw pressure spring 14 is positioned coaxially in the magnet system and in the depiction provided by FIG. 8 presses the armature 4 to the left with its pressure element 5, between the brake shoes 10 and 17. When the coil 1 is provided with current the armature 4 is drawn over the armature path 3 to the right, against the force of the brake spring 14, while the design of the poles 30 of the armature 4 and of the magnet body 2 yield a horizontal characteristic curve, as shown in FIG. 9. As regards adjustment, the pole core 27 of the magnet body 2, which supports the brake spring 14 by means of a counternut 29, can be axially adjusted.

The operation of the braking device in the embodiments depicted in FIGS. 5 and 8 can be seen from the diagram shown in FIG. 9, in which the magnetic force $F_M$ is given as a function of the armature path h.

When the brake is released, the coil 1 is first fed briefly with increased current, so that there is an over-excitation corresponding to the characteristic line $F_M$ shown in FIG. 9.

With this over-excitation the magnetic force $F_M$ over the entire armature path is greater than the spring force $F_F$ of the brake spring 14. In the terminal position of the armature 4, where h=0, the current fed to the coil 1 is switched from over-excitation to nominal excitation at reduced power, so that the holding force $F_H$ is established, which despite the lower nominal current is greater than the spring force $F_F$ of the brake spring 14. The brake is thus reliably kept in the brake shoe's released state.

What is claimed is:

1. A braking device comprising:

At least one brake shoe having a first area and a second area, at least one pressure element having an area, a brake spring, a magnet system with a coil and an armature, wherein the at least one brake shoe is movable in a first direction perpendicular to a linear or rotary motion in order to press the first area against a braking area and to brake the motion, wherein the brake spring is acting on the at least one pressure element in a second direction perpendicular to the first direction, wherein the at least one pressure element is movable by the armature against the force of the brake spring when current is fed to the coil, wherein the at least one pressure element acts with its area on the second area of the at least one brake shoe, wherein the first area and the second area of the at least one brake shoe are inclined relatively to each other with a wedge angle ($\alpha$) between 0° and 90°, whereby the force of the brake spring is diverted from the second direction into the first direction and is reinforced in accordance with the wedge angle ($\alpha$).

2. A braking device according to claim 1, wherein the pressure element (5, 18) is rigidly connected to the armature (4).

3. A braking device according to claim 1 wherein the one or more brake shoes (10, 17) are movably mounted perpendicular to the direction of motion of the armature (4) and of the pressure element (5, 18) and perpendicular to the direction of motion (23) of the motion being braked.

4. A braking device according to claim 3, wherein the one or more brake shoes (10, 17) are movably mounted in a housing (15) belonging to the braking device and are supported in a form-fitting manner against the braking forces acting in the direction of motion (23) of the motion being braked.

5. A braking device according to claim 3, wherein at least one reset spring (11, 21, 28) lifts the one or more brake shoes (10, 17) from the braking surface (13) when said brake shoes (10, 17) are released.

6. A braking device according to claim 1, wherein the interacting diagonal wedge areas (7, 8) of the one or more pressure elements (5, 18) and the one or more brake shoes (10, 17) exhibit the same angle ($\alpha$).

7. A braking device according to claim 6, wherein a flat-cage rolling bearing (16) is positioned between the interacting diagonal wedge areas (7, 8).

8. A braking device according to claim 1, wherein two pressure elements (5) are provided, which are positioned on either side of a brake rail or brake disk (12) being braked, and the brake shoes (10) press against braking areas (13) lying opposite each other on the brake rail or brake disk (12).

9. A braking device according to claim 1, wherein a pressure element (5, 18) presses against a brake shoe (10), and a second brake shoe (17) that acts on the opposite side of a brake rail or brake disk (12) functions as an end support for the braking force.

10. A braking device according to claim 9, wherein the pressure element (5, 18) in the shape of a double wedge exhibits two diagonal wedge areas which act on the two brake shoes (10, 17).

11. A braking device according to claim 1, wherein the magnet system is a pot-type magnet system, in which the armature (4) moves in front of the axial face of the coil (1) and of the magnet body (2).

12. A braking device according to claim 1, wherein the magnet system is a lifting magnet system, in which the armature (4) moves coaxially in the coil (1).

13. A braking device according to claim 1, wherein to release the brake the coil (1) is first fed briefly to a point of over-excitation with a multiple of the nominal current, until the armature (4) reaches its terminal position, and the coil (1) is then fed with the nominal current, which in the terminal position of the armature (4) exerts a magnetic force ($F_H$) which is greater than the spring force ($F_F$) of the brake spring (14).

14. A braking device according to claim 1, wherein the angle ($\alpha$) of the diagonal wedge areas (7, 8) is chosen in accordance with the equation $$tg\ \alpha = 2 \cdot h_o / s_{max}$$

where $s_{max}$ is the maximum air gap between the braking areas (13) and the brake shoes (10,17) and $h_o$ is the optimal armature path yielding the energy maximum $W_o$ of the brake spring (14).

* * * * *

UNITED STATES PATENT AND TRADEMARK OFFICE
CERTIFICATE OF CORRECTION

PATENT NO. : 6,802,402 B2
DATED : October 12, 2004
INVENTOR(S) : Bausch et al.

It is certified that error appears in the above-identified patent and that said Letters Patent is hereby corrected as shown below:

Column 7,
Line 39, please insert -- at least one -- between "the" and "pressure".
Lines 39-40, please delete "(4)" and delete "(5, 18)".
Line 42, please insert -- at least -- between "the" and "one".
Line 42, please delete "or more".
Line 42, please insert -- shoe is -- between "brake" and "shoes".
Line 42, please delete "shoes (10,17) are".
Line 43, please delete "the" between "to" and "direction" and insert therefor -- a --.
Lines 44-45, please delete "(4)" and "(5,8)" and "(23)".
Line 48, please insert -- at least -- between "the" and "one".
Line 48, please delete "or more".
Line 48, please delete "shoes (10, 17) are" and insert therefor -- shoe is --.
Line 49, please delete "(15)".
Line 50, please delete "are" and insert therefor -- is --.
Line 52, please delete "(23)".

Column 8,
Line 2, please delete "(11, 21, 28)".
Line 2, please insert -- at least -- between "the" and "one".
Line 2, please delete "or more".
Line 3, please delete "shoes (10,17)" and insert therefor -- shoe --.
Line 3, please delete "surface (13)" and insert therefor -- area --.
Line 4, please insert -- at least one -- between "said" and "brake".
Line 4, please delete "shoes (10,17) are" and insert therefor -- shoe is --.
Line 6, please delete "the" which precedes "interacting" and delete "(7,8)".
Line 6, please insert -- at least -- between "the" and "one".
Lines 6-7, please delete "or more".
Line 7, please delete "elements (5, 18)" and insert therefor -- element --.
Line 7, please insert -- at least -- between "the" and "one".
Line 7, please delete "or more".
Line 8, please delete "shoes (10, 17)" and insert therefor -- shoe --.
Lines 10-11, please delete "(16)" and delete "(7, 8)".
Lines 13-14, please delete "(5)" and delete "(12)".
Line 15, please insert -- corresponding -- between "the" and "brake".
Lines 15-17, please delete "the", delete "(10)", delete "(13)", and delete "(12)".
Line 19, please insert -- the at least one -- between "wherein" and "a".
Line 19, please delete "a" which precedes "pressure" and delete "(5,18)".
Line 19, please insert -- first -- between "a" and "brake".
Lines 20-21, please delete "(10)", delete "(17)" and delete "(12)".

UNITED STATES PATENT AND TRADEMARK OFFICE
CERTIFICATE OF CORRECTION

PATENT NO. : 6,802,402 B2
DATED : October 12, 2004
INVENTOR(S) : Bausch et al.

It is certified that error appears in the above-identified patent and that said Letters Patent is hereby corrected as shown below:

<u>Column 8, (cont'd,)</u>
Line 25, please insert -- at least one -- between "the" and "pressure".
Line 25, please delete "(5, 18)" and insert therefor -- is --.
Line 26, please insert -- and -- between "wedge" and "exhibits".
Line 27, please delete "(10, 17)".
Line 30, please delete "(4)".
Line 30, please delete "the" which precedes "axial" and insert therefor -- an --.
Line 30, please delete "(1)".
Line 31, please insert -- a -- between "of" and "the".
Line 31, please delete "the" and "(2)".
Line 34, please delete "(4)" and "(1)".
Line 36, please insert -- , -- between "brake" and "the".
Line 36, please delete "(1)".
Line 37, please delete "the" and insert therefor -- a --.
Lines 38-39, please delete "(4)" and delete "(1)".
Line 40, please delete "(4)".
Line 41, please insert -- a -- between "than" and "the" and delete "the" before "spring".
Line 42, please delete "(14)".
Line 44, please insert -- wedge -- between "the" and "angle".
Line 44, please delete "of the diagonal wedge areas (7, 8)".
Line 46, please delete "the" which precedes "maximum" and insert therefor -- a --.
Line 49, please delete "areas (13)" and insert therefor -- area --.
Line 49, please insert -- at least one -- between "the" and "brake".
Line 49, please delete "shoes (10, 17)" and insert therefor -- shoe --.
Line 49, please delete "the" which precedes "optimal" and insert therefor -- an --.
Line 50, please insert -- an -- between "yielding" and "the".
Lines 50-51, please delete "the" which precedes "energy" and delete "(14)".

Signed and Sealed this

Third Day of May, 2005

JON W. DUDAS
*Director of the United States Patent and Trademark Office*